US011434020B2

(12) United States Patent
Cayssials et al.

(10) Patent No.: US 11,434,020 B2
(45) Date of Patent: Sep. 6, 2022

(54) ASSEMBLY FOR AN AIRCRAFT, SAID ASSEMBLY HAVING A PYLON AND A RESERVOIR CONTAINING AN EXTINGUISHING FLUID

(71) Applicant: Airbus Operations SAS, Toulouse (FR)

(72) Inventors: Julien Cayssials, Toulouse (FR); Jean Geliot, Toulouse (FR); Adeline Soulie, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 217 days.

(21) Appl. No.: 16/940,747

(22) Filed: Jul. 28, 2020

(65) Prior Publication Data
US 2021/0101694 A1 Apr. 8, 2021

(30) Foreign Application Priority Data
Jul. 30, 2019 (FR) ...................................... 1908645

(51) Int. Cl.
*B64D 37/32* (2006.01)
*B64D 37/02* (2006.01)

(52) U.S. Cl.
CPC ............. *B64D 37/32* (2013.01); *B64D 37/02* (2013.01)

(58) Field of Classification Search
CPC .. B64D 37/02; B64D 37/32; B64D 2045/009; A62C 3/08; A62C 35/02
See application file for complete search history.

(56) References Cited

U.S. PATENT DOCUMENTS

2010/0230122 A1  9/2010 Machado et al.
2017/0096238 A1  4/2017 Porte et al.

FOREIGN PATENT DOCUMENTS

DE  102012203740 B3 * 7/2013  .............. A62C 3/08
EP  3305372 A1  4/2018

OTHER PUBLICATIONS

French Search Report; priority document.

* cited by examiner

*Primary Examiner* — Philip J Bonzell
*Assistant Examiner* — Colin Zohoori
(74) *Attorney, Agent, or Firm* — Greer, Burns & Crain, Ltd.

(57) ABSTRACT

An assembly for an aircraft including a pylon having a lateral wall with a window passing through it, at least one reservoir, each reservoir being in the shape of an elongate ellipsoid with three semi-axes. The dimension of the reservoir along a first semi-axis differs from the dimension of the reservoir along at least one other semi-axis. The reservoir extends parallel to the semi-major axis, between a first end and a second end. The reservoir is equipped with a discharge head at the second end. The reservoir is equipped with a fastening arrangement disposed on the side of the second end and fastening the reservoir to the pylon. The reservoir is positioned through the window with the first end housed in the pylon and the second end outside the pylon.

6 Claims, 3 Drawing Sheets

ASSEMBLY FOR AN AIRCRAFT, SAID ASSEMBLY HAVING A PYLON AND A RESERVOIR CONTAINING AN EXTINGUISHING FLUID

CROSS-REFERENCES TO RELATED APPLICATIONS

This application claims the benefit of the French patent application No. 1908645 filed on Jul. 30, 2019, the entire disclosures of which are incorporated herein by way of reference.

FIELD OF THE INVENTION

The present invention relates to an assembly for an aircraft, the assembly having a pylon and a reservoir containing an extinguishing fluid, and to an aircraft having at least one such assembly.

BACKGROUND OF THE INVENTION

An aircraft conventionally has at least one nacelle, inside which an engine, for example of the jet engine type, is disposed. The nacelle and the engine are fastened to the structure of the aircraft by means of a pylon fastened beneath the wing of the aircraft.

In order to avoid the structure of the aircraft becoming damaged in the event of the engine catching fire, the aircraft is equipped with a fire-fighting system which has two reservoirs.

FIG. 5 shows an assembly 550 of the prior art which has a pylon 500 and two reservoirs 502 which are installed in the pylon 500 and which each contain an extinguishing fluid. Each reservoir 502 is spherical and, for each reservoir 502, the pylon 500 has a window 504 which passes through a lateral wall of the pylon 500 and through which the reservoir 502 is inserted and fastened inside the pylon 500. Furthermore, the dimensions of the window 504 are increased so as to allow the operator to insert their hands in order to fasten the reservoir 502.

Each reservoir 502 is equipped with a discharge head 506 which has a disc which closes the reservoir 502 and an explosive cartridge which destroys the disc when it is activated. For each reservoir 502, the fire-fighting system also has a discharge pipe 508 which extends inside the pylon 500 between the discharge head 506 and the engine.

The destruction of the disc allows the extinguishing fluid to be released and then to flow into the discharge pipe 508.

Currently, new extinguishing fluids may be used, and they require larger storage volumes. Consequently, the dimensions of the reservoirs 502 must be increased.

Installing these new reservoirs 502 in the pylon 500 therefore requires larger windows which could weaken the structure of the pylon 500. It is therefore necessary to find a different installation which preserves the structure of the pylon 500 while allowing the storage volumes of the reservoirs 502 to be increased.

SUMMARY OF THE INVENTION

An object of the present invention is to propose an assembly for an aircraft, wherein the assembly has a pylon and at least one reservoir containing an extinguishing fluid, and wherein installing the reservoir in the pylon does not require a large window to be created.

To that end, what is proposed is an assembly for an aircraft, the assembly having:
a pylon having a lateral wall with a window passing through it, and
at least one reservoir, each reservoir being in the shape of an elongate ellipsoid with three semi-axes, wherein the dimension of the reservoir along a first semi-axis differs from the dimension of the reservoir along at least one other semi-axis, wherein the reservoir extends parallel to the semi-major axis, between a first end and a second end, wherein the reservoir is equipped with a discharge head at the second end, wherein the reservoir is equipped with fastening means disposed on the side of the second end and fastening the reservoir to the pylon, wherein the reservoir is positioned through the window with the first end housed in the pylon and the second end outside the pylon.

Such an assembly makes it possible to limit the dimension of the window while allowing the volume of the reservoir to be increased. Furthermore, installing the discharge head and the discharge pipe outside the pylon makes the connection between the pipe and the discharge head easier.

Advantageously, the assembly has a discharge pipe fluidically connected to the discharge head and the discharge pipe extends out of the pylon.

Advantageously, the assembly has a collar secured to the reservoir, the axis of the collar is coaxial with the semi-major axis, and the collar is disposed on the side of the second end, such that, when the reservoir is in the operating position, the collar bears against the lateral wall and closes off the window.

Advantageously, the assembly has rails fastened inside the pylon and extending parallel to the semi-major axis, the rails are disposed in the continuation of the lower edge of the window, at the first end, the reservoir has a shoe fastened in the bottom part of the reservoir, and the shoe is positioned on the rails.

Advantageously, the assembly has an immobilizing system which immobilizes the shoe when the reservoir is in the operating position.

Advantageously, the immobilizing system is in the form of a bracket fastened above the rails and beneath which the shoe is positioned.

The invention also proposes an aircraft having an assembly according to one of the preceding variants.

BRIEF DESCRIPTION OF THE DRAWINGS

The abovementioned features of the invention, along with others, will become more clearly apparent on reading the following description of an exemplary embodiment, the description being given with reference to the appended drawings, in which.

DETAILED DESCRIPTION OF THE PREFERRED EMBODIMENTS

Figure 1:
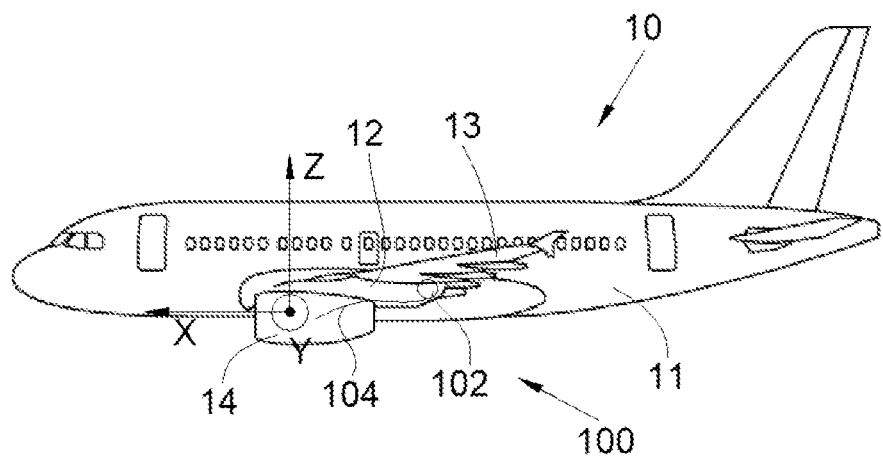
FIG. 1 is a side view of an aircraft according to the invention.

In the following description, terms relating to a position are considered in relation to an aircraft in a normal flight position, i.e., as shown in FIG. 1.

In the following description, and by convention, the X direction is the longitudinal direction of the jet engine, which is parallel to the longitudinal axis of the aircraft, the Y direction is the transverse direction, which is horizontal when the aircraft is on the ground, and the Z direction is the vertical direction, which is vertical when the aircraft is on the ground, these three directions X, Y and Z being mutually orthogonal.

FIG. 1 shows an aircraft 10 which has a fuselage 11, to each side of which is fastened a wing 13 which bears an engine 14 such as a turbofan, for example.

For each engine 14, the aircraft 10 also has a pylon 12 which fastens the engine 14 beneath the wing 13.

For each engine 14, the aircraft 10 has a fire-fighting system 100 which has at least one reservoir 102 and, for each reservoir 102, a discharge pipe 104 which extends between the reservoir 102 and the engine 14 supported by the pylon 12.

Figure 2:
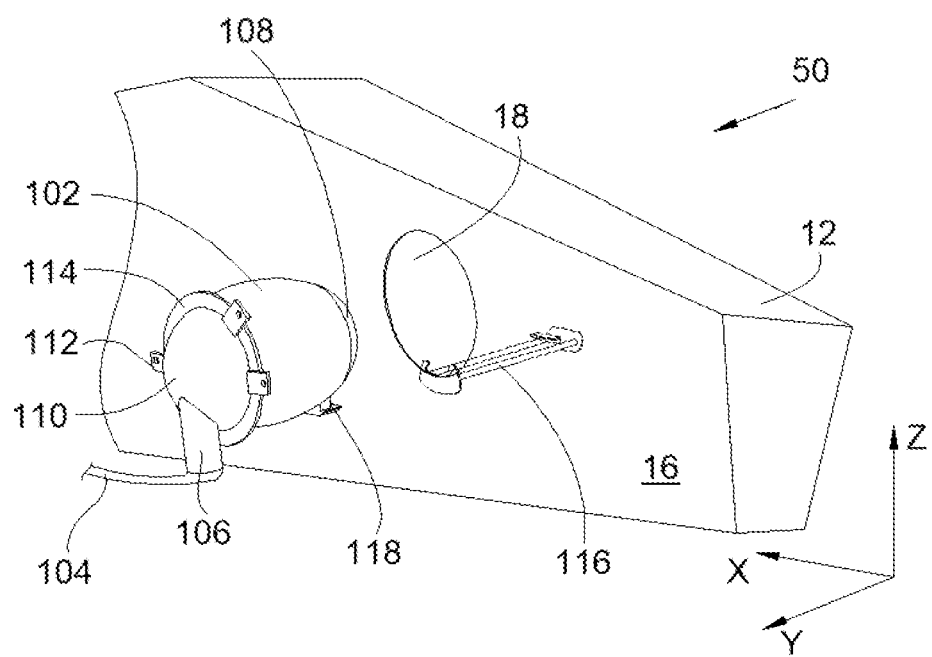
FIG. 2 is a perspective view of an assembly according to the invention, in a first assembly position.
Figure 3:
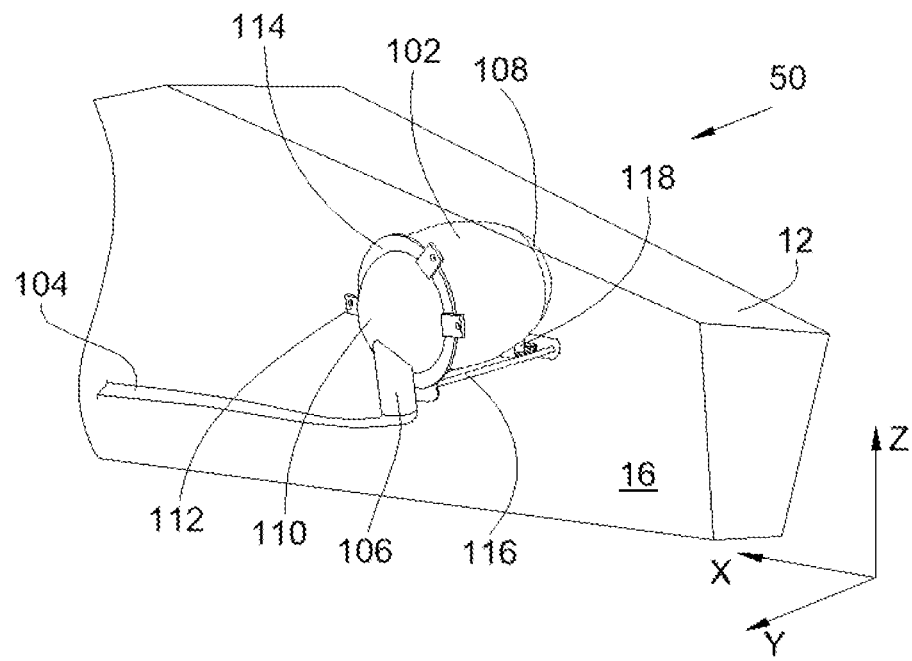
FIG. 3 is a perspective view of the assembly according to the invention, in a second assembly position corresponding to the operating position.

FIG. 2 and FIG. 3 show an assembly 50 which has the pylon 12, the reservoir 102 and the discharge pipe 104.

The reservoir 102 is filled with an extinguishing fluid and it has a discharge head 106, to which the discharge pipe 104 is fluidically connected. The discharge head 106 has a disc which closes the reservoir 102 and an explosive cartridge which destroys the disc when it is activated.

The pylon 12 conventionally extends in a longitudinal direction and has two lateral walls 16, namely a port-side lateral wall 16 and a starboard-side lateral wall.

The lateral wall 16, in this case the port-side lateral wall, has a window 18 passing through it which allows access to the inside of the pylon 12. The window 18 is in this case circular, but it may also be another shape depending on the section of the reservoir 102.

The reservoir 102 has a non-spherical shape and has an elongate shape of ellipsoid or ovoid type.

Preferably, the reservoir has the shape of an ellipsoid elongated along three semi-axes, namely the semi-major axis, the semi-median axis and the semi-minor axis, wherein the dimension of the reservoir along a first semi-axis differs from the dimension of the reservoir along at least one other semi-axis.

The semi-major axis extends parallel to the transverse direction Y, the semi-median axis extends parallel to the vertical direction Z and the semi-minor axis extends parallel to the longitudinal direction X.

In the embodiment of the invention which is presented in FIGS. 2 and 3, the dimension of the reservoir 102 along the semi-median axis and the dimension of the reservoir 102 along the semi-minor axis are equal and the reservoir 102 is rugby ball shaped.

This elongate ellipsoid shape makes it possible to have a larger reservoir volume without increasing the maximum diameter of the reservoir 102.

The reservoir 102 extends parallel to the semi-major axis, between a first end 108 and a second end 110.

The discharge head 106 is disposed at the second end 110 of the reservoir 102.

The reservoir 102 is equipped with fastening means 112, in this case tabs with screws, which are disposed on the side of the second end 110. The fastening means 112 fasten the reservoir 102 to the pylon 12 when the reservoir 102 is in the operating position.

Putting the reservoir 102 in place comprises inserting the first end 108 into the window 18 (FIG. 2) in a direction parallel to the semi-major axis, until the reservoir 102 is in the operating position (FIG. 3). The operator thus installs the reservoir 102 from the outside, which also makes it possible to limit the dimensions of the window 18 so that only the reservoir 102 can pass through it.

When the reservoir 102 is in the operating position, the second end 110 remains outside the pylon 12 with the discharge head 106, which also remains outside the pylon 12, and is therefore accessible from the outside, which makes the connection with the discharge pipe 104, which also remains outside the pylon 12, easier. Thus, when the reservoir 102 is in the operating position, it is positioned through the window 18, with the first end 108 housed in the pylon 12 and the second end 110 outside the pylon 12.

When the reservoir 102 is in the operating position, the fastening means 112 remain accessible from the outside and are locked so as to keep the reservoir 102 in position. In the embodiment of the invention which is presented in FIG. 3, screws are screwed into the lateral wall 16 through the tabs.

Installing such an assembly 50 makes it possible to have an increased volume for the extinguishing fluid without having to increase the diameter of the window 18 and therefore without risk to the structure of the pylon 12. Furthermore, moving the discharge head 106 and the discharge pipe 104 out of the pylon 12 frees up space inside the pylon 12 for placing other elements such as hydraulic lines, for example, therein. The position of the discharge head 106 and of the discharge pipe 104 on the outside also makes it possible to replace one or the other of them without it being necessary to remove the reservoir 102.

In order to close the window 18, when the reservoir 102 is in the operating position, the assembly 50 has a collar 114 secured to the reservoir 102. The collar 114 is in the form of a ring, of which the axis is coaxial with the semi-major axis, and the collar 114 is disposed on the side of the second end 110, such that, when the reservoir 102 is in the operating position, the collar 114 bears against the lateral wall 16 and closes off the window 18.

In the embodiment of the invention which is presented in FIGS. 2 and 3, the tabs of the fastening means 112 are fastened to the collar 114.

In order to make it easier to put the reservoir 102 in the operating position in the pylon 12, the assembly 50 has rails 116 which are fastened inside the pylon 12 and which extend parallel to the semi-major axis. The rails 116 are disposed in the continuation of the lower edge of the window 18. The rails 116 are fastened, for example, to the box of the pylon 12.

At the first end 108, the reservoir 102 has a shoe 118 which is fastened in the bottom part of the reservoir 102.

When the first end 108 is inserted into the window 18, the shoe 118 comes to be placed on the rails 116 and the shoe 118 slides on the rails 116 as the reservoir 102 is moved further inside the pylon 12.

Figure 4:
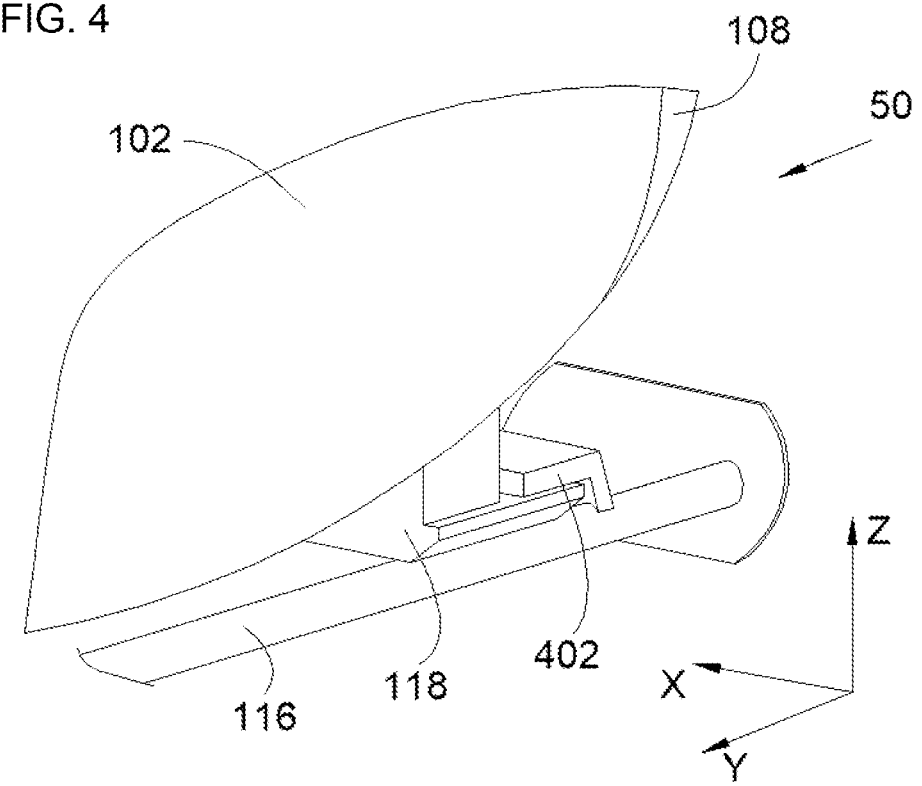
FIG. 4 is a detail of the fastening of the reservoir to the pylon.
Figure 5:
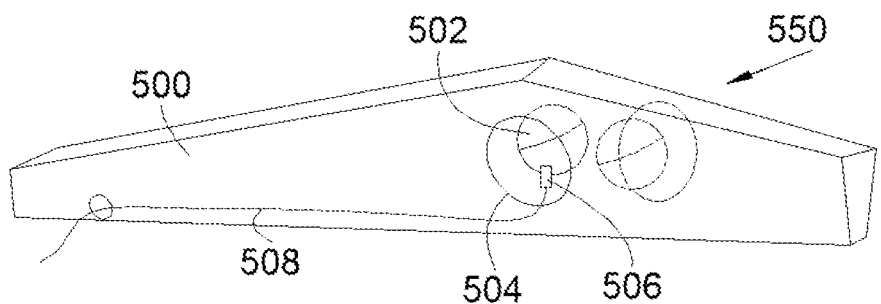
FIG. 5 is a perspective view of an assembly of the prior art.

FIG. 4 shows an enlargement of the assembly 50 when the reservoir 102 is in the operating position with the shoe 118 which is positioned on the rails 116 which support it.

In order to immobilize the first end 108, when the reservoir 102 is in the operating position, the assembly 50 has an immobilizing system 402 which immobilizes the shoe 118.

In the embodiment of the invention in FIG. 4, the immobilizing system 402 is in the form of a bracket fastened above the rails 116 and beneath which the shoe 118 is positioned. The shoe 118 is thus located between the rails 116 and the bracket. The bracket prevents vertical movement of the shoe 118 and movement parallel to the rails 116 beyond the bracket.

Of course, other immobilizing systems are possible, such as a conical pin secured to the shoe 118 and coming to be housed in a bore provided for this purpose in the box of the pylon 12, for example. The conical pin then has its axis parallel to the semi-major axis.

Once the shoe 118 has been immobilized by the immobilizing system 402 and the fastening means 112 have fastened the reservoir 102 to the pylon 12, the forces are transmitted to the structure.

In the embodiment of the invention described above, there is a single reservoir 102 per pylon 12, but there are preferentially at least two reservoirs 102 per pylon 12. The invention then applies in the same way to each reservoir 102 and, in this case, there is a window 18 in each lateral wall 16, namely in the port-side lateral wall and the starboard-side lateral wall, and one reservoir 102 per window 18.

At least one aerodynamic fairing panel (not shown) is affixed and fastened to each lateral wall 16 of the pylon 12 so as to obtain better aerodynamic flow around the pylon 12. The fairing panels comprise housings for housing and covering the discharge pipes 104, the second end 110 and the discharge head 106.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft, said assembly comprising:
    a pylon having a lateral wall with a window passing through the wall, and
    at least one reservoir, said at least one reservoir having a shape of an elongate ellipsoid with three semi-axes, including a semi-major axis,
    wherein a length dimension of the reservoir along a first of the semi-axes differs from a length dimension of the reservoir along at least one other of the semi-axes,
    wherein the reservoir extends parallel to the semi-major axis, between a first end and a second end,
    wherein the reservoir is equipped with a discharge head at the second end,
    wherein the reservoir is equipped with fastening means disposed on a side of the second end for fastening the reservoir to the pylon,
    wherein the reservoir is positioned through the window with the first end housed in the pylon and the second end outside the pylon, and
    wherein said assembly further comprises rails fastened inside the pylon and extending parallel to the semi-major axis,
    wherein the rails are disposed in a continuation of a lower edge of the window,
    wherein, at the first end, the reservoir has a shoe fastened in a bottom part of the reservoir, and
    wherein the shoe is positioned on the rails.

2. The assembly according to claim 1, further comprising a discharge pipe fluidically connected to the discharge head and wherein the discharge pipe extends out of the pylon.

3. The assembly according to claim 1, further comprising a collar secured to the reservoir,
    wherein an axis of the collar is coaxial with the semi-major axis, and
    wherein the collar is disposed on a side of the second end, such that, when the reservoir is in an operating position, the collar bears against the lateral wall and closes off the window.

4. The assembly according to claim 1, further comprising an immobilizing system which immobilizes the shoe when the reservoir is in an operating position.

5. The assembly according to claim 4, wherein the immobilizing system is a bracket fastened above the rails and beneath which the shoe is positioned.

6. An aircraft comprising an assembly according to claim 1.

* * * * *